United States Patent [19]
Dochterman

[11] 3,854,916
[45] Dec. 17, 1974

[54] SYSTEM USING MOTOR DRIVEN CONTROL DEVICE

[75] Inventor: Richard W. Dochterman, Fort Wayne, Ind.

[73] Assignee: General Electric Company, Fort Wayne, Ind.

[22] Filed: June 29, 1973

[21] Appl. No.: 374,970

Related U.S. Application Data

[63] Continuation-in-part of Ser. No. 223,916, Feb. 7, 1972, Pat. No. 3,743,872.

[52] U.S. Cl..................... 62/180, 62/155, 62/177, 62/183, 200/38, 310/90
[51] Int. Cl............................................. F25d 17/00
[58] Field of Search ............ 62/155, 177, 180, 183, 62/158; 310/90

[56] References Cited
UNITED STATES PATENTS

| | | | |
|---|---|---|---|
| 1,922,508 | 8/1933 | Terry | 62/183 |
| 3,059,447 | 10/1962 | Brugler | 62/183 |
| 3,159,980 | 12/1964 | Solley | 62/158 |
| 3,742,160 | 6/1973 | Murray | 200/38 R |

Primary Examiner—William J. Wye

[57] ABSTRACT

Refrigeration system includes a timer particularly adapted for controlling the defrost cycle of a refrigerator, and an electric motor that may be used, e.g., to drive an evaporator or condenser cooling fan. Control device and motor detachably secured and magnetically coupled to one another. Speed reducing gear train is mechanically driven from the control device input member and a switch actuator cam cyclically causes selective opening and closing of switch contacts. Control device may be enclosed to prevent the admission of foreign matter. Unit bearing type of motor includes a polarized magnetic body that forms part of the rotor assembly and is rotatable within a lubricant reservoir of the motor. Oil reservoir cover is formed of nonferromagnetic material. The polarized magnetic body establishes a magnetic field that extends beyond the confines of the motor and causes similar movement of a polarized magnetic body in the control device. When control device is stalled torque body is alternately supplied by and received by the motor.

3 Claims, 4 Drawing Figures

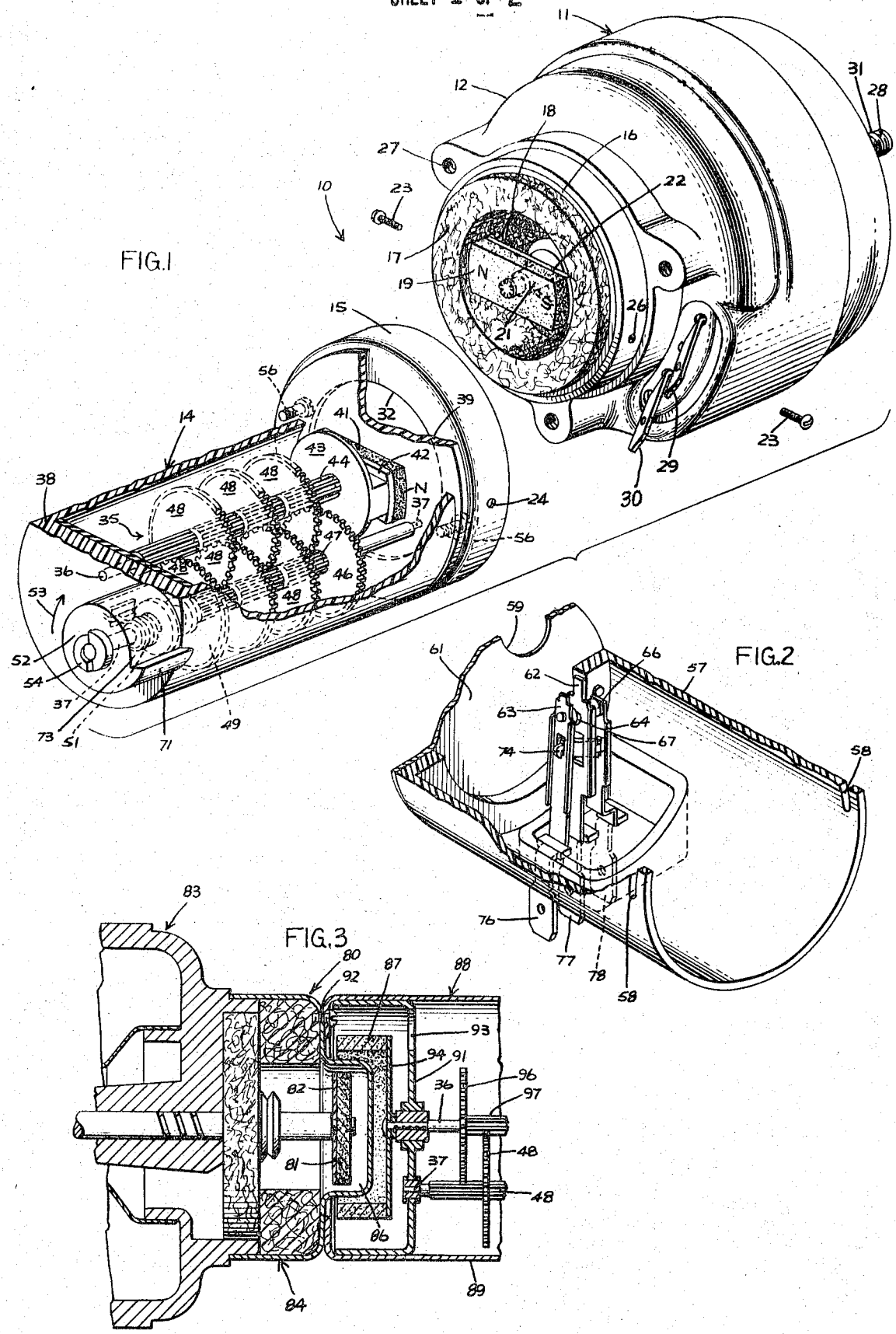

SYSTEM USING MOTOR DRIVEN CONTROL DEVICE

CROSS-REFERENCE TO RELATED APPLICATION

This application is a continuation-in-part of my application Ser. No. 223,916, now U.S. Pat. No. 3,743,872, which was filed Feb. 7, 1972 and titled Control Device, Dynamoelectric Machine, And Assembly Of Same and which issued as U.S. Pat. No. 3,743,872 on July 3, 1973. Woods' application Ser. No. 323,729, filed Jan. 15, 1973, titled Magnetically Driven Timer, which issued as U.S. Pat. No. 3,825,781 on July 23, 1974 and which is assigned to the assignee of this application also is a related application. The disclosure of both of the just identified applications are incorporated herein by reference.

BACKGROUND OF THE INVENTION

The present invention relates generally to systems utilizing motor driven control devices such as refrigeration systems having a by such device. machine of a type that may be used in systems embodying the invention;

Motor driven control devices have long been utilized in many different appliance applications. For example, Losert U.S. Pat. No. 3,552,115 discloses, inter alia, an interval timing apparatus of a type that may be utilized during operation of, e.g., cooking equipment. Motor driven timers also may be utilized to provide a means of automatically controlling all or a portion of a cycle of washing, drying, and refrigeration equipment, among others.

A defrost cycle is one of the functions that may be controlled in refrigeration apparatus and Lennon U.S. Pat. No. 3,193,652 discloses, among other things, a motor driven control that may be used for this purpose. The particular defrost control device selected for a given application may include switch contacts connected in a power supply circuit for selectively energizing a refrigerant compressor motor and defrosting means. Solley U.S. Pat. No. 3,159,980 is one patent that describes an approach wherein an evaporator fan motor would be used to drive a defrost control. Other approaches have involved the use of condenser fan motors that in turn are interconnected with a control device as taught by the Solley patent. In all of the prior arrangements of which I am aware, however, the motor is provided with a drive pinion that meshes with the input gear of a speed changing mechanism, e.g., a multi-section speed reducing gear train.

Heretofore, this type of arrangement has been relatively expensive to produce in practice, and the general approach has been to provide a drive pinion equipped small synchronous motor as the power source for the control device mechanism. Although the cost of a control device so constructed must, of necessity, reflect the cost of the motor included therewith, this general approach has nonetheless been followed because of the relative ease with which this approach will provide the requisite precision alignment and meshing of the motor pinion and control device input gear. The need to provide precision alignment will be better appreciated by noting that the control device may include a mechanism for providing a 500,000 to 1 speed reduction and yet still be relatively small in over-all size.

Thus, relatively small, if not miniature gears and pinions are used that typically may have a tooth working depth and/or tooth thickness in the neighborhood of about 1/32 of an inch. The above mentioned precision alignment must be maintained in order to insure satisfactory operation of the control device over a relatively long period of time. The desirability of eliminating the motor normally provided as part of the control device package and using instead a condenser or evaporator fan motor has long been recognized and is evidenced, for example, by the above referenced Solley patent. However, the requirement for precision location and alignment of motor pinions and other gears, among other things, have prevented these other approaches from being successfully adopted in practice.

In addition, in any refrigeration system using the above described approach, a malfunction of the timer package that results in seizure or binding of the gear train would stall and thus prevent operation of evaporator or condenser fan motor. This of course is objectionable and at least in the case of a stalled condenser fan motor which is relied upon for forced air condenser cooling objectionably high condenser temperatures may result and the entire system may cease to operate satisfactorily.

Accordingly, it would be desirable to provide control device such that it could be driven or powered by a motor used in an appliance for other purposes, e.g., for moving a fluid; and such that the problems of precision drive pinion alignment are overcome. Moreover, it would be desirable to provide an arrangement whereby a modular approach may be followed so that a motor designed primarily for use as a fluid material mover may be supplied and installed separately or as an assembly with a control device. In a more desirable arrangement, the control device would be a module and this would then facilitate initial installation or subsequent replacement of the control device. It also would be advantageous to provide an arrangement whereby the recognized problems associated with the movement of motor lubricant to components of the control device (for example, oil movement that might foul the control device switch contacts) may be substantially reduced, if not eliminated.

SUMMARY OF THE INVENTION

Accordingly, it is an object of the present invention to provide a new and improved system wherein a control device is tightly coupled with an electric motor during normal operation, and loosely coupled under abnormal conditions, e.g., in the event the control device malfunctions.

In carrying out the above and other objects of the invention in one form thereof, I provide a system that includes a control device exemplified as a timer of a type particularly adapted for controlling the defrost cycle of a refrigerator, and an electric motor that may be used, e.g., to drive a condenser or evaporator cooling fan. In a preferred embodiment, the control device and motor may be detachably secured to one another and tightly coupled by magnetic means so that movement of the rotor assembly of the motor will cause a corresponding, substantially synchronized movement of an input member of the control device during normal conditions. However, in the event that the control device malfunctions, the motor and control device are in effect, loosely coupled so that the motor does not stall. In the illustrated control device, a speed reducing gear train is mechanically driven from the input member and a switch actuator (shown as a cam) cyclically causes selective opening and closing of switch contacts. The control device may, if desired, be essentially totally enclosed to prevent the admission of foreign matter that might jam the gear train or that might deleteriously affect switch operation.

While the electric motor may have bearing supports at either end of the rotor assembly and may be designed for mechanical duty, a unit bearing motor of a type commonly used for refrigeration condenser fan applications has been shown for purposes of exemplification and discussion. In the illustrated arrangement, a polarized magnetic body, secured to and forming part of the rotor assembly, is rotatable within a lubricant reservoir of the motor. A lubricant reservoir cover (e.g., an oil well cover) closes the reservoir and, at least in the vicinity of the magnetic body, is formed of an essentially nonmagnetic material such as aluminum or plastic. Thus, the magnetic body establishes a magnetic field that extends beyond the confines of the motor. The influence of this magnet, during movement thereof, causes similar movement of a polarized magnetic body that forms at least a part of the control device input member. The control device and motor are modular units and may be manufactured and transported as individually complete components if desired, since the lubricant reservoir cover will prevent the loss of lubricant from the motor during transport as well as during operation.

When the motor and control device are interconnected to form part of a system as illustrated herein, the motor drives a cooling fan and continues to do so even if there is control device malfunction. Under desired normal conditions, the control device is also driven by the motor.

The invention itself is particularly set forth in the claims in the concluding portion hereof. However, the above mentioned and other features and objects of the present invention and manner of attaining them will become more apparent and will be better understood by reference to the following description of embodiments of the invention taken in conjunction with the accompanying drawing.

BRIEF DESCRIPTION OF THE DRAWING

In the drawing:

FIG. 1 is an exploded perspective view, with parts in section, parts removed, and parts broken away, of an assembly of a control device and a dynamoelectric machine of a type that may be used in systems embodying the invention;

FIG. 2 is an inverted perspective view, with parts in section, parts removed, and parts broken away of a switching means and support therefor that has been removed from the structure of FIG. 1 but normally is assembled therewith;

FIG. 3 is a side elevation, with parts in section, parts removed, and parts broken away, illustrating another motor and control assembly.

DESCRIPTION OF THE PREFERRED EMBODIMENTS

Figure 4:
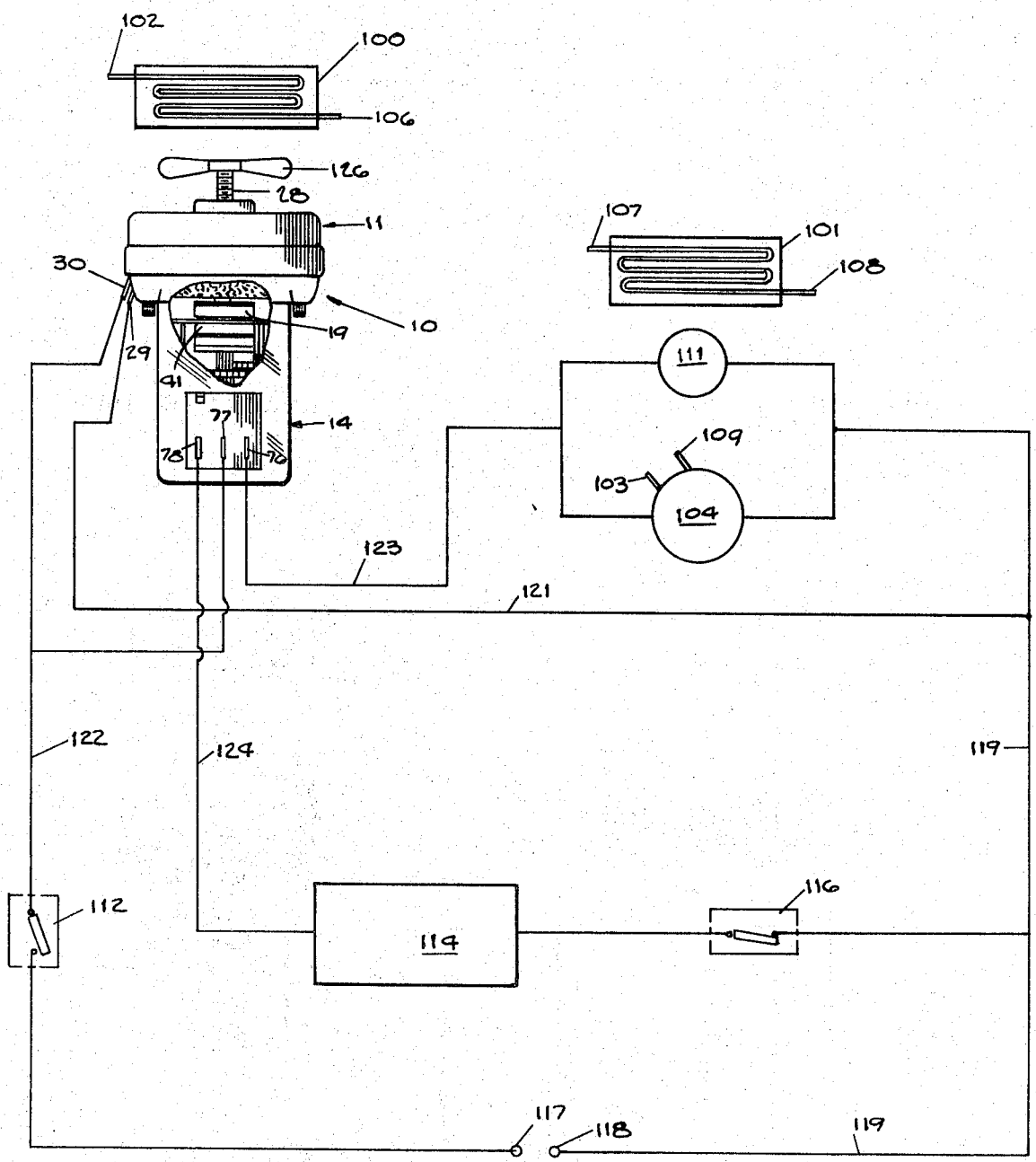
FIG. 4 is a schematic representation of a refrigeration system embodying and illustrating the invention.

With reference to FIG. 1, by way of example only, an exploded assembly 10 of a dynamoelectric machine and control device has been illustrated as including an electric motor 11 of the unit bearing type having a stator assembly 12 and rotor assembly; and a control 14 that is particularly adapted for use as an automatic defrost control in a refrigerator.

The motor 11 is a modular unit, that is, it may be manufactured, transported, and utilized with a control device other than the illustrated control device 14 or in conventional manner without a control device. However, when the motor 11 is to be transported and/or used separately, the end cap or oil well cover 15 (normally provided to prevent loss of lubricant from the lubricant reservoir 16 of the motor) will be assembled with the motor rather than the control device 14 as shown in the drawing.

Disposed within the lubricant reservoir 16 are means, such as a felt ring 17 and felt feeder wick 18, for storage and supply of lubricant for the bearing means of the motor 11. Furthermore, the rotor assembly of the motor 11, in addition to including a laminated magnetic rotor core having a short-circuited squirrel cage winding, includes a polarized magnetic body 19 secured to one end of the shaft 21 of the rotor assembly.

As clearly revealed in FIG. 1, the shaft 21 includes a magentic means locating shoulder. After the illustrated magnetic means has been positioned on the shaft 21, the shaft and magnetic means are permanently fastened together in any suitable manner. For example, the end of shaft 21 may be peened or swedged against the polarized magnetic body 19. Other suitable means for accomplishing this result, known in the art, include epoxy or other structural adhesive materials, and expanding or threading type fasteners.

The magnetic coupling means of the motor 11 may have essentially only two poles, N, S, as shown, or four or more poles and also may be substantially any desired shape. The magnetic means preferably include a low reluctance path defining member such as the illustrated soft iron plate 22. As will be understood, the plate 22 may be laminated to the polarized magnetic body 19 or assembled therewith when securing the magnetic means to the shaft 21. By providing the plate 22, a magnetic field of greater strength or intensity will extend from the polarized body 19 toward the control device 14 than would otherwise be the case.

When the motor 11 is to be manufactured and transported separately, the oil well cover 15 will be assembled therewith, e.g., by means of the threaded fasteners 23. Of course other suitable means may also be used, and the cover may be press fitted to the motor shell or secured thereto with epoxy or other adhesive material. When the fasteners 23 are used, they pass through the openings 24 in the cover 15 and are secured to the threaded openings 26 in the motor shell.

The illustrated motor 11 is of a general type that has been utilized heretofore in many fluid material moving applications. For example, the motor 11 may be mounted, by means of suitable fasteners retained in the threaded openings 27, in proximity to the condenser coil of refrigeration equipment. In these and similar applications, a fan blade will be received and fastened to the threaded portion 28 of the shaft 31. As previously mentioned, a motor having two or more bearing means may be utilized, and the unit bearing motor 11 has been shown only for purposes of exemplification.

When the motor 11 is installed in the desired environment where it will be used, it may be energized in any known or desired fashion by applying an energization voltage across the termination means of the motor that has been illustrated as the terminals 30, 29.

The rotor assembly of motor 11 includes two separate means for transferring power from the motor. A first of these means is the extension 31 of the shaft which may be mechanically coupled to a power transmitting member such as a gear, hub, fan blade, pulley, sprocket, and so on. The second of these means is the magnetic coupling means that establishes a moving magnetic field which in turn may be used to magnetically couple the motor 11 with a device to be driven thereby. In the illustrated exemplification, the second power transfer means may be utilized without loss of lubricant from the lubricant reservoir 16 since the reservoir will be substantially completely sealed by the oil well cover 15.

In order to maximize the strength of the moving magnetic field established by movement of the polarized magnetic body 19, it is preferable to form the cover 15 from a nonmagnetic material, such as aluminum or plastic or at least to arrange the cover 15 so that a portion of the cover (defined for example by the illustrated opening 32) overlying the magnetic means will be either open or formed of a material so as to not prevent the establishment of a magnetic field (associated with the polarized magnetic body 19) outside the confines of cover 15. Accordingly, when the cover 15 is formed of steel as illustrated, a window or opening therein is formed as shown at 32. If desired, the opening may be sealed with a plastic, aluminum, or other nonmagnetic material member to prevent loss of lubricant from reservoir 16 and to prevent entry thereinto of foreign matter.

In applications where a rotor assembly shaft extends externally from both ends of a motor, a polarized body of magnetic material may be supported for movement externally of the motor. In these forms, an end frame or oil well cover may be made substantially in the same manner as has been done heretofore. For example, a polarized body of magnetic material may be provided on an end of the shaft of a so-called "skeleton" type of motor as shown, e.g., in Church U.S. Pat. No. 3,709,457 which issued Jan. 9, 1973, and the entire diesclosure of which is incorporated herein by reference. The polarized body of magnetic material so provided would be supported on the shaft of the skeleton motor on the exterior of an oil reservoir cover normally provided on such motors.

With continued reference to FIG. 1, the control device 14 includes a speed reducing mechanism illustrated as a driven gear reduction drive train 35. In the device illustrated, a pair of shafts 36, 37 are each supported at opposite end walls 38, 39 of the housing of the device. The input member for the device is freely rotatable on the shaft 36 and includes a polarized body of magnetic material 41 that may be substantially identical to the body 19. The polarized body 41 and a common iron plate 42 may be secured by adhesive material or other suitable means to a gear or disc 43 that is fixedly secured to a driving pinion 44.

It is emphasized that the magnetic means of the control device 14, i.e., the polarized body 41 may be of any desired configuration and need not be substantially identical to the polarized body 19 as shown in FIG. 1. During operation of the assembly 10, as the polarized body 19 moves, the magnetic field associated therewith will cause the polarized body 41 to effect rotation of the drive pinion 44, the entire assemblage of elements 41 through 44 turning freely on the shaft 36. Pinion 44 in turn drives gear 46 and pinion 47 attached thereto, both of which are freely rotatable on the shaft 37. Similar gear and pinion members, denoted by numeral 48, are used to establish a desired over-all speed reduction of the device 14. In the illustrated exemplification, the gear and pinion members as well as disc 43 were formed of nylon material and, when the speed of motor 11 was about 1,440 r.p.m., the output speed of the shaft 37 was about 0.00241 r.p.m. All of the pinions used in the illustrated device 14 were provided with 11 teeth and all of the gears were provided with 58 teeth so that the over-all speed reduction ratio was about 597,423 to 1.

The final or output gear and pinion set 48, denoted by the reference numeral 49, are fastened to the shaft 37 by a known manner, e.g., by press fitting the gear and pinion set 49 to the shaft 37 or by forcing the set 49 onto a knurled section of the shaft 37. The shaft 37, through a unidirectional slip clutch in the form of a coil spring 51, drives a switch actuator illustrated as cam 52. During operation, the cam 52 is driven in the direction of arrow 53 through the slip clutch arrangement.

When it is desired to reset or reposition the cam 52 relative to the shaft 37, a cam reset member 54 secured to or integral with the cam 52 may be moved, relative to shaft 37, in the same direction as that indicated by arrow 53. Thus, the cam 52 may be reset or repositioned relative to the shaft 37. As will be understood, during such an adjustment, movement of the cam 52 causes the convolutions of the spring 51 to open slightly and release the shaft 37. However, when shaft 37 is the driving member, the convolutions of the spring 51 will tend to be tightened on the shaft 37 and insure that the cam 53 is driven by the shaft 37 in the direction of the arrow 53.

For ease of fabrication of the assembly shown in exploded form in FIG. 1, a window 32 (described above) was cut in the oil well cover 15 and screws 56 were used to secure together the oil well cover and end wall 39 of the control device housing. When assembled, a swtich contact support member (shown as an additional substantially cylindrical housing 57 in FIG. 2) was also assembled with the structure illustrated in FIG. 1.

In the final assembly, the fasteners 23 were inserted initially through openings illustrated as slots 58 in the cover 57 and thus secure together all of the structure illustrated in FIGS. 1 and 2. When assembled, the housing and switch means shown in FIG. 2 are inverted relative to the position thereof as shown in FIG. 2. After such inversion, the opening 59 formed in the rear wall 61 of cover 56 is substantially centered and aligned with the axis of the output shaft 37. The opening 59 then provides access for adjusting or resetting the position of cam 52 on the shaft 37. This adjustment may be performed when desired by inserting a tool through the opening 59 and engaging the adjusting disc 54 for movement thereof as previously described.

During operation of the control device 14, either one or both of the center spring 62 and inner spring 63 (these relative positions being established by their positions relative to the center of cam 52) will be engaged by the surface of the cam 52 during at least part of each full revolution of the cam 52. As will be understood, the inner and outer contact springs 63, 64, respectively, each support an electrical contact element or surface 66 whereas the center spring member 62 supports a pair of oppositely facing contact surfaces 67.

Under normal operating conditions, when the device 14 is utilized as a defrost cycle control, the inner spring 63 (or at least the outermost extremity thereof) rides on the surface of the cam 52 and the contact 66 of the inner spring 63 will be in closed electrical circuit maintaining relationship with a contact 67 on the center spring 62. Then, as the high point 71 of the cam 52 reaches the extremities of the spring arms 63, 62, switching will occur, with the inner spring 63 snapping downwardly toward the relieved region 73 of the cam 52 as the cam continues rotating. Snapping arm or spring 63, through connector 74, pulls the outer spring arm 64 toward the center spring 62 and contact between springs 63 and 62 is broken whereas electrical contact between springs 62 and 66 is established.

During the just described portion in the switching cycle, the refrigeration compressor normally will be de-energized and defrosting means, such as a heater, will be energized. Spade type terminals 76, 77 and 78 are respectively connected to the spring members 63, 62, and 64.

When the terminals 76, 77, 78 are connected in a refrigeration apparatus energization circuit for operation of the device 14 as above described, terminal 77 may conveniently be connected in circuit with one side of the supply line whereas terminal 76 may be connected to one side of the compressor motor (utilized to compress and move a fluid, such as refrigerant, through refrigeration coils), and the terminal 78 may be connected to one side of a defrosting means, such as a heater.

In the exemplification just described, I have found that only a small amount of torque need be transmitted from the polarized body 19 to the input of the device 14 in order to attain enough output torque for the desired switching operation of the device 14. More than a sufficient amount of torque for this purpose can be transmitted with the arrangement substantially as illustrated in FIGS. 1 and 2. For example, with the gap between the facing portions of polarized bodies 19 and 41 being held at approximately ¼ to ⅜ of an inch, about 24 ounce-inches of torque can be attained with the motor 11 operating at a nominal speed of about 1,440 r.p.m.

The polarized magnetic bodies 19 and 41 may be formed of any suitable material. In the exemplification, permanent magnet material in the form of ferrite powder within a nitrile rubber matrix was utilized. This type of material is commercially available from different sources, one of which is designated by Minnesota Mining & Manufacturing Company as "Plastiform" permanent magnet material. In the exemplification, the bodies 19 and 41 were about 5/10 of an inch wide by about 9/10 of an inch long and about 1/10 of an inch thick. However, for reasons, including ease of fabrication and utilization of economically available materials, one or both of the polarized magnetic bodies may be in the form of disc magnets. For example, discs of about 0.125 inches thick and about 0.875 inches in diameter may be used in the exemplification with about the same results. Thus, the spacing between the disc magnets would still be in the order of about ¼ to ⅜ of an inch and the torque transmittable therebetween would be approximately as described above, while utilizing a windowless substantially imperforate oil well cover formed of about 0.026 of an inch thick aluminum material. Regardless of the shape of the polarized bodies, other materials may also be used. For example, magnetic material in a phenolic matrix or ALNICO magnet material may be used, among others.

A disc type magnet 81, backed by a common iron washer 82 is utilized as the power output polarized magnetic body in the assembly 80 shown in FIG. 3. The motor 83 in assembly 80 is substantially identical to the motor 11. The oil well cover 84 is formed of about 0.026 of an inch aluminum material and is press fitted and adhesively secured to the housing of the motor 83. It will be seen from FIG. 3 that the cover 84 is formed to have generally cup shaped portion indicated by the numeral 86. The polarized magnetic body 81 is located generally within this portion 86 of the cover.

The driven polarized magnetic body 87 is in the form of a cylindrical magnetic collar. In the arrangement illustrated by FIG. 3, the cylindrical shaped collar 87 is preferably provided with the same number of poles of opposite polarity as the number of poles of opposite polarity that are provided around the circular or cylindrical periphery of the disc 81. The control device 88 shown in FIG. 3 may be constructed and utilized for generally the same purposes as the control device 14. However, for ease of fabrication, the housing 89 thereof is illustrated as a generally tubular shaped drawn or formed steel or aluminum tube, with a cup shaped shaft supporting member 91 pressed therein. The device 88 is secured to the oil well cover 84 by means of screws 92 as shown. Access for insertion and removal of a plurality of screws 92 is permitted by holes 93 formed in the cover 91, the location of such holes and screws being selected so that access thereto will not be prevented by the gears on the shaft 37.

In the FIG. 1 exemplification, all of the gear pairs 48 are freely rotatable on the shaft 37 in a fashion similar to that described abo e in connection with the device 14. However, the driven polarized magnetic body 87 is secured through an adapter or disc 94 to the shaft 36 by peening or other suitable means. The input or first gear 96 and pinion 97 attached thereto are locked to the shaft 36, e.g., by being press fitted thereon, so that power will be transmitted from shaft 36 to the gear and pinion 96, 97 in the assembly 80.

The remainder of the device 88, including gear pairs 48, the balance of shafts 36 and 37, a cam corresponding to cam 52, and switching means have not been shown, it being understood that these elements will be included in an assembly 80 but have been omitted from FIG. 3 in order to simplify description thereof. It also will be understood that the configuration of cam 52 or other means driven by the motor 11, including the entire control device magnetically coupled therewith, may be provided in any desired configuration so as to provide any desired sequence of switch operation and dwell periods between switch actuation to thus provide a desired sequence of control functions or operations.

With reference now to FIG. 4, a system embodying the invention has been schematically depicted as a refrigeration system that includes refrigeration heat transfer means in the form of condenser coils 100 and evaporator coils 101.

As will be understood, the high pressure side or end 102 of coils 100 are connected to the high pressure outlet 103 of a compressor 104. The compressor has been illustrated as a hermetically sealed motor and compressing means unit, but it will be understood that the particular type of refrigerant compressing equipment used will be a matter of choice for each given application.

A refrigerant fluid (compressed by compressor 104) flows through coils 100 and from the outlet 106 thereof to the inlet 107 of the evaporator coils 101. Means, commonly referred to, e.g., as an "expansion", "throttle," or "capillary flow restrictor" valve may be interposed at the inlet of the evaporating means so that, when freon based or similar types of refrigerant fluids are used; a relatively high pressure, high temperature liquid is converted to a relatively low pressure, low temperature gas in the relatively low pressure, environment of the interior of the evaporator coils. Outlet of the evaporator coils is connected, of course, to the suction or inlet side 109 of compressor 104.

Of course, suitable conduit or tubing is used to interconnect the compressor, evaporator, and condenser means as will be understood by persons skilled in the art. Specific illustration of the same, however, has been omitted in the interest of clarity and conciseness of the present application. It also will be understood that, for household refrigeration applications, the heat absorbing evaporator coils 101 would form part of heat transfer means utilized to cool a food storage compartment, while heat liberating condenser coils 100 are located in a position remote from the evaporator coils.

An evaporator or air circulation fan and motor 111 (as described in more detail, for example, in the above referenced Solley patent) may be used to force air circulation past the evaporator coils 101. In addition, the system of FIG. 4 may include a compartment thermostat or "cold control" 112, means 114 for heating the evaporator coils during a defrost cycle, and a defrost switch or thermostat 116. The means 114 may include an electric heater, as will be understood or a high temperature refrigerant bypass arrangement as described in the Solley patent. The switch or thermostat 116 may be used to ensure that heating means 114 are operative only when a monitored region (e.g., a region adjacent the evaporator coils) is below a predetermined temperature. If desired, however, switch or thermostat 116 may be omitted, and control device 10 used as the only means for disabling or disconnecting the heating means 114.

The terminals 117, 118 are normally connected to a suitable source of excitation voltage which, in the case of a household refrigerator, would usually be a conventional source of 50 hz or 60 hz current.

One side of the supply voltage is applied by line 119 to the circulation fan motor 111 and compressor 104, to motor 11 through circuit means 121, and to heater means 114 through switch means 116 (when used). The other side of the voltage source is selectively connected, through control 112 and by means of circuit means 122, to terminal 30 of motor 11 and to terminal 77 of control device 14.

Control device 14 selectively connects the circuit means 122 to circuit means 123 for energization of compressor 104 and fan motor 111, or to circuit means 124 for energization of the defrost heat supplying means 114, 116.

With a system as just described, operation of motor 11 will drive control device 14 during normal conditions. TYe magnetic coupling of motor 11 and control device 14 through magnetic bodies 19 and 41 is "tight" enough (i.e., enough torque is transmitted thereby) to ensure operation of control device 14.

However, this coupling is also sufficiently "loose" to permit motor 11 to start rotating and reach operating speed even if control device 14 malfunctions and polarized body or magnetic means is prevented from rotating in synchronism with magnetic body 19. Essentially the only criteria for permitting operation of motor 11 when control device 14 is "stalled" or "locked" is that the locked rotor torque of motor 11 be greater than the initial restraining torque between magnets 19 and 41 by an amount sufficient to start turning fan means 126. Once the shaft of motor 11 starts turning, the energy expended during one part of a shaft revolution to move selected poles of magnet 19 toward selected poles of magnet 41 is returned as these poles of magnet 19 move past such poles of magnet 41.

In other words, after the shaft of motor 11 starts rotating, essentially no net work is required from motor 11 due to magnet 41 being locked against rotation. Thus, a "loose" or "hysteretic" coupling between magnets 19 and 41 exists when magnet 19 is rotating and magnet 41 is stalled.

With systems of the type just described, at least part of the expense and reliability problems associated with a separate and distinct drive motor for control device 14 is eliminated. On the other hand, any malfunction of control device 14 is not expected to result in stalling of motor 11 and a resultant failure or malfunction of the refrigeration system due to overheating or thermal overloading of condenser coils 100 and compressor 104.

It will now be seen that I have provided new control devices and systems such that failure of an entire system will not result even in the event that a control device used in such system malfunctions. Thus difficulties that otherwise might be associated with using a motor for a given fan (e.g., for a condenser cooling fan) to drive and control devices may be eliminated.

Accordingly, while I have described what at present are considered to be preferred embodiments of my invention in accordance with the Patent Statutes, it will be obvious to those skilled in the art that various changes and modifications may be made therein without departing from the invention. It is aimed in the appended claims, therefore, to cover all variations and modifications as fall within the true spirit and scope of the invention.

What I claim as new and desire to secure Letters Patent of the United States is:

1. A refrigeration system including refrigeration heat transfer means comprising condenser and evaporator coils, a motor driven compressor interconnected with the condenser and evaporator coils, an electric fan motor drivingly coupled with fan means for forcing air past at least some of the coils, and a control device including switching means for selectively providing excitation voltage for the compressor motor; said fan motor including a magnetic power output member and said control device including a magnetic power input member, said fan motor and control device being magnetically coupled through the output and input members so that the control device is driven by the fan motor during normal operation of the system and so that fan motor operation is not adversely affected during excitation of the compressor motor by malfunctions of the control device.

2. The refrigeration system of claim 1 wherein the fan motor and control device are separate modules assembled together with the magnetic power output member and magnetic power input members positioned in torque transmitting relationship to one another.

3. A refrigeration system including refrigeration heat transfer means comprising condenser and evaporator coils, a motor driven compressor interconnected with the condenser and evaporator coils, an electric fan motor drivingly coupled with fan means for forcing air past at least some of the coils, and a control device including switching means for selectively providing excitation voltage for the compressor motor; said fan motor and control device being interconnected with torque transmission means for continuously supplying driving torque to the control device from the fan motor during normal operation of the control device and for alternately applying driving torque to and receiving driving torque from the control device during operation of the fan motor when the control device is in a stalled condition.

* * * * *